United States Patent
Mayumi et al.

(10) Patent No.: US 8,698,783 B2
(45) Date of Patent: Apr. 15, 2014

(54) TOUCH PANEL

(75) Inventors: Masashi Mayumi, Osaka (JP); Atsushi Okada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 161 days.

(21) Appl. No.: 13/497,096

(22) PCT Filed: May 10, 2010

(86) PCT No.: PCT/JP2010/057858
§ 371 (c)(1),
(2), (4) Date: Mar. 20, 2012

(87) PCT Pub. No.: WO2011/043093
PCT Pub. Date: Apr. 14, 2011

(65) Prior Publication Data
US 2012/0182267 A1 Jul. 19, 2012

(30) Foreign Application Priority Data
Oct. 7, 2009 (JP) .................................. 2009-233168

(51) Int. Cl.
*G06F 3/042* (2006.01)
(52) U.S. Cl.
USPC ........................................................ 345/175
(58) Field of Classification Search
USPC ............... 345/207, 104, 173–183; 178/18.09, 178/18.11, 19.05
See application file for complete search history.

(56) References Cited

U.S. PATENT DOCUMENTS

| 5,051,574 | A | 9/1991 | Yoshida et al. | |
| 7,015,961 | B2 * | 3/2006 | Kakarala | 348/246 |
| 2005/0093466 | A1 * | 5/2005 | Matsumoto | 315/169.3 |
| 2005/0195163 | A1 * | 9/2005 | Grewal et al. | 345/157 |
| 2007/0285683 | A1 | 12/2007 | Someya et al. | |

FOREIGN PATENT DOCUMENTS

| JP | 03-033679 A | 2/1991 |
| JP | 2005-236770 A | 9/2005 |
| JP | 2008-186374 A | 8/2008 |

OTHER PUBLICATIONS

Official Communication issued in International Patent Application No. PCT/JP2010/057858, mailed on Aug. 10, 2010.

* cited by examiner

*Primary Examiner* — Hong Zhou
(74) *Attorney, Agent, or Firm* — Keating & Bennett, LLP

(57) ABSTRACT

Disclosed is a touch panel comprising a display panel (for example, a liquid crystal panel) (1); a plurality of mirrors (2) provided on an edge of a display surface side of the display panel (1); a light source (3); a plurality of light sensors (4) embedded in the display panel (1), positioned immediately under the mirrors (2), and for which light emitted from the light source (3) is guided by the mirrors (2); and a data interpolation processing unit that, if an output signal from a certain light sensor included in the plurality of light sensors (4) is at most at a threshold, calculates interpolation data from output signals that are stronger than the threshold from light sensors about a periphery of the certain light sensor.

2 Claims, 4 Drawing Sheets

| COMPARISON RESULT | INTERPOLATION | FIRST PARAMETER | SECOND PARAMETER | THIRD PARAMETER |
|---|---|---|---|---|
| LHLLL | YES | FF5 | FF3 | 2 |
| LHLLH | YES | FF5 | FF3 | 2 |
| LHLHL | YES | FF5 | FF3 | 2 |
| LHLHH | YES | FF5 | FF3 | 2 |
| LHHLL | YES | FF5 | FF2 | 3 |
| LHHLH | YES | FF5 | FF2 | 3 |
| LHHHL | YES | FF5 | FF1 | 4 |

TOUCH PANEL

TECHNICAL FIELD

The present invention is related to a touch panel, and in particular, to an optical-sensor touch panel which uses an optical sensor to detect an input position on which an input operation is performed by using a pen point or a fingertip.

BACKGROUND ART

An example of a configuration of an LM (Light Matrix) type optical-sensor touch panel is schematically shown in FIGS. 1 and 2. FIG. 1 is a front view showing an LM-type optical-sensor touch panel, and FIG. 2 is a cross sectional view of the LM-type optical-sensor touch panel shown in FIG. 1, taken along line A-A of FIG. 1.

As shown in FIG. 1, mirrors 2 are arranged at upper, left, and right edges of a display surface of a liquid crystal panel 1. A plurality of mirrors 2 need to be arranged at each of the upper, left, and right edges for lower implementation cost. In addition, as shown in FIG. 1, a plurality of LEDs are arranged at a lower edge of the display surface of the liquid crystal panel 1 as an LED (Light Emitting Diode) 3.

The liquid crystal panel 1 has optical sensors 4 embedded therein at positions immediately under the mirrors 2 (see FIG. 2), such that a plurality of optical sensors 4 are arranged at each of the upper, left, and right edges.

Light emitted from the LED 3 spreads out to cover a surface of the liquid crystal panel 1 (see FIG. 1). The light that has spread over the surface of the liquid crystal panel 1 is directed by the mirrors 2 to the optical sensors 4 (see FIG. 2). The LM-type optical-sensor touch panel shown in FIGS. 1 and 2 includes a data processing section (not shown), and input positions on which input operations are performed by using, for example, a pen point or a fingertip is detected through processing of outputs from the optical sensors 4 performed by the data processing section.

CITATION LIST

Patent Literature

Patent Literature 1: JP-A-2005-236770

SUMMARY OF INVENTION

Technical Problem

However, light is not reflected in a desirable manner at overlapping positions of the mirrors 2, and thus, optical sensors located immediately under, or in the vicinity of, the overlapping positions of the mirrors 2 suffer a phenomenon that their output values are remarkably lower than those of the other optical sensors (hereinafter, an optical sensor that suffers this phenomenon will be referred to as a missing sensor). As a result, whether the data processing section processes calibration data or processes sensor read-out data, a defect occurs in an image (sensor image) obtained from outputs of the optical sensors 4 at a portion of the image corresponding to an output of a missing sensor (see FIG. 3).

Patent Literature 1 discloses an image scanner and a signal processing method which are capable of appropriately interpolate a missing pixel (a portion of a contact image sensor where intervals between adjacent imaging elements are not uniform) and further can perform the interpolation with high accuracy even when sensitivity characteristics of the imaging elements of the contact image sensor are not uniform. However, the image scanner disclosed in Patent Literature 1 performs interpolation of a missing pixel by using linear interpolation or a high-order function, and thus, unevenness of, for example, sensitivity characteristics of the imaging elements constituting the contact image sensor may prevent correct interpolation, resulting in disadvantageously degraded image scanning quality. In particular, interpolation results in a considerable error in a case where an image of high periodicity is scanned, causing remarkable degradation of the scanned image quality. In addition, image scanner disclosed in Patent Literature 1 is not intended to alleviate the inconvenience of periodic remarkable output reduction of a sensor caused by arranging a plurality of mirrors in an LM-type optical-sensor touch panel.

The present invention has been made in view of the foregoing, and an object of the present invention is to provide a touch panel capable of alleviating the problem of periodical occurrence of remarkable output reduction of an optical sensor caused by arranging a plurality of mirrors.

Solution to Problem

To achieve the above object, according to the present invention, a touch panel includes a display panel, a plurality of mirrors arranged at an edge of a display surface of the display panel, a light source, a plurality of optical sensors which are embedded in the display panel to be positioned immediately under the mirrors such that light emitted from the light source is directed to the plurality of optical sensors by the mirrors, and a data interpolation processing section which, in a case where an output signal from an optical sensor included in the plurality of optical sensors is not greater than a threshold value, calculates interpolation data by using output signals from optical sensors around the optical sensor which are greater than the threshold value.

According to the present invention, the touch panel may be configured as follows: the data interpolation processing section includes a holding section, a comparison section, a calculation section, and an interpolation section; the holding section holds output signals from a predetermined number of optical sensors included in output signals from the plurality of optical sensors; the comparison section compares each of the output signals from the predetermined number of optical sensors included in the output signals from the plurality of optical sensors with the threshold value such that, in a case where an output signal from an optical sensor is not greater than the threshold value, the comparison section notifies the calculation section that the output signal from the optical sensor is insufficient, and, in a case where an output signal from an optical sensor is greater than the threshold value, the comparison section notifies the interpolation section that the output signal from the optical sensor is sufficient; the calculation section calculates interpolation data for an output signal from an optical sensor which is notified to the calculation section by the comparison section as outputting an insufficient output signal; and the interpolation section outputs an output from the holding section as output data with respect to an output signal from an optical sensor which is notified to the interpolation section by the comparison section as outputting a sufficient output signal, and the interpolation section outputs an output from the calculation section as output data with respect to an output signal from an optical sensor which is not notified to the interpolation section by the comparison section as outputting a sufficient output signal.

According to the present invention, in the touch panel, the calculation section may calculate the interpolation data by using a linear least-squares method.

Advantageous Effects of Invention

According to a touch panel of the present invention, an output signal of a missing sensor is automatically detected, and an output signal from the missing sensor is interpolated by using output signals from optical sensors around the missing sensor. With this feature, it is possible to alleviate the problem of periodical occurrence of considerable reduction of outputs from optical sensors caused by arranging a plurality of mirrors.

Furthermore, according to the touch panel of the present invention, since an output signal from a missing sensor is automatically detected, it is not necessary for the data interpolation processing section to acquire information of overlapping positions of the mirrors in advance. Thus, the same data interpolation processing section can be commonly used in different cases in which mirrors are arranged in different fashions, and this widens the application range of the data interpolation processing section of the present invention.

DESCRIPTION OF EMBODIMENTS

Hereinafter, a description will be given of an embodiment of the present invention with reference to the accompanying drawings. A touch panel embodying the present invention is configured such that a data interpolation processing section is newly added between an optical sensor and a data processing section of a typically-configured LM-type optical-sensor touch panel.

Figure 1:
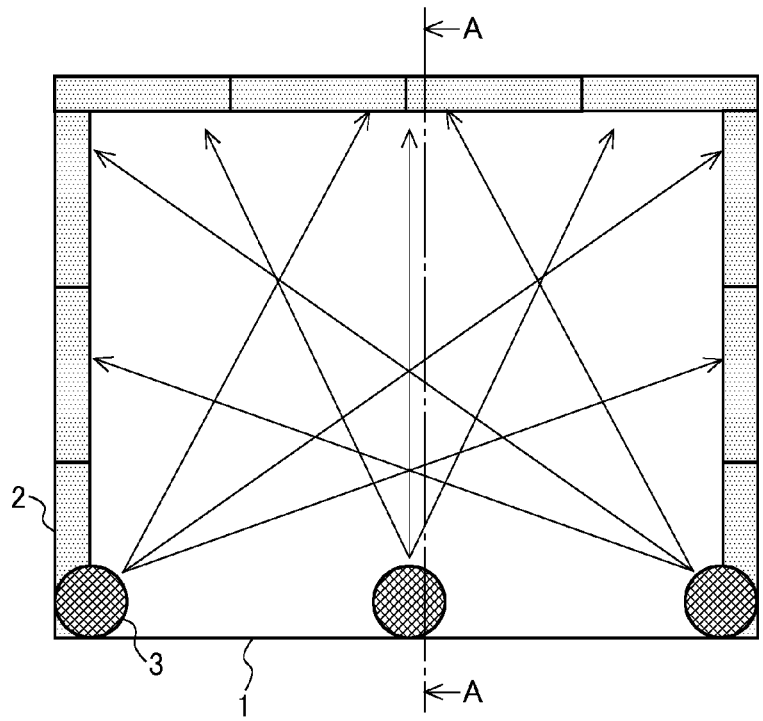
[FIG. 1] A front view schematically showing an example of a configuration of an LM-type optical-sensor touch panel.
Figure 2:
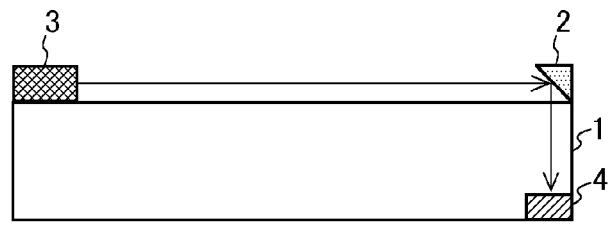
[FIG. 2] A sectional view schematically showing an example of a configuration of an LM-type optical-sensor touch panel.
Figure 3:
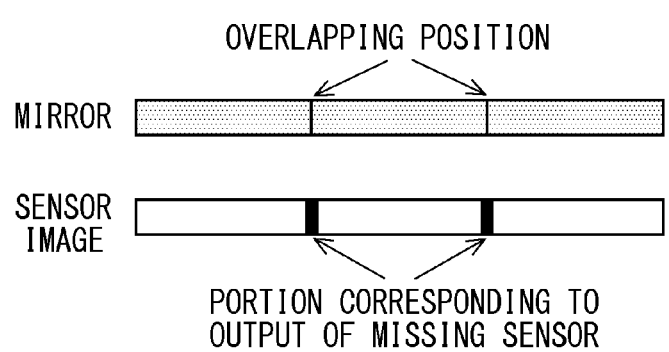
[FIG. 3] A diagram showing a relationship between mirrors and a sensor image.
Figure 4:
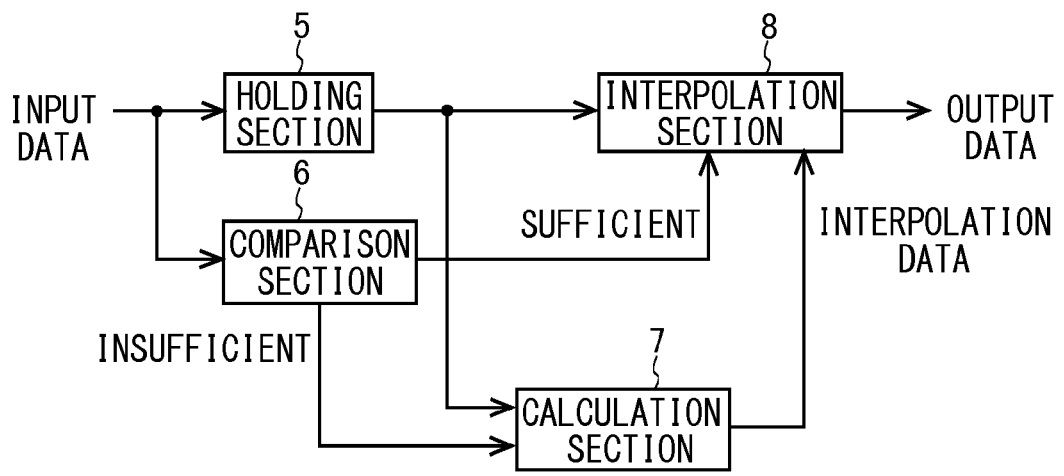
[FIG. 4] A block diagram schematically showing an example of a configuration of data interpolation processing section which is a characteristic section of a touch panel embodying the present invention.

An example of a configuration of the data interpolation processing section, which is a characteristic section of the touch panel embodying the present invention, is schematically shown in FIG. 4. The data interpolation processing section shown in FIG. 4 includes a holding section 5, a comparison section 6, a calculation section 7, and an interpolation section 8.

Input data is a group of output signals from optical sensors 4, and in the input data, the output signals are arranged in an order according to locations of the corresponding optical sensors 4, that is, for example, in the order from a lower end to an upper end of a left edge of a liquid crystal panel 1 as seen from the display surface side thereof, then from a left end to a right end of an upper edge of the liquid crystal panel 1, then from an upper end to a lower end of a right edge of the liquid crystal panel 1.

The holding section 5 holds output signals of a predetermined number of optical sensors 4 included in the input data. The comparison section 6 compares each of the output signals of the predetermined number of optical sensors 4 included in the input data with a threshold value which is set in advance; if an output signal from an optical sensor 4 is not greater than the threshold value, the comparison section 6 notifies the calculation section 7 that the output signal from the optical sensor 4 is insufficient, and, if an output signal from an optical sensor 4 is greater than the threshold value, the comparison section 6 notifies the interpolation section 8 that the output signal from the optical sensor 4 is sufficient. The calculation section 7 calculates interpolation data for the output signal of the optical sensor 4 which has been notified to the calculation section 7 by the comparison section 6 as being insufficient. With respect to the output signal of the optical sensor 4 that has been notified to the interpolation section 8 by the comparison section 6 as being sufficient, the interpolation section 8 outputs a corresponding output from the holding section 5 as output data. With respect to the output signal of the optical sensor 4 that has not been notified to the interpolation section 8 by the comparison section 6 as being sufficient, the interpolation section 8 outputs a corresponding output from the calculation section 7 as output data.

Figure 5A:
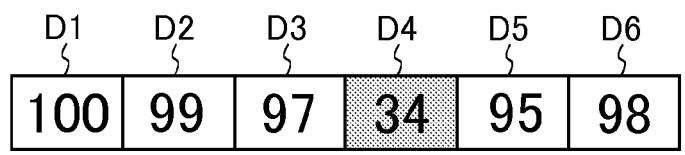
[FIG. 5A] A diagram showing an example of a part of input data of the data interpolation processing section shown in FIG. 4.
Figure 5B:
[FIG. 5B] A diagram showing an example of a part of output data corresponding to the part of the input data shown as an example in FIG. 5A.

With the data interpolation processing section shown in FIG. 4, for example, a part of output data corresponding to the part of input data shown in FIG. 5A is as shown in FIG. 5B. In this example, an output signal D4 from an optical sensor 4 is judged to be insufficient by the comparison section 6, and output signals D1-D3, D5, and D6 from other optical sensors 4 are judged to be sufficient by the comparison section 6.

Figure 6:
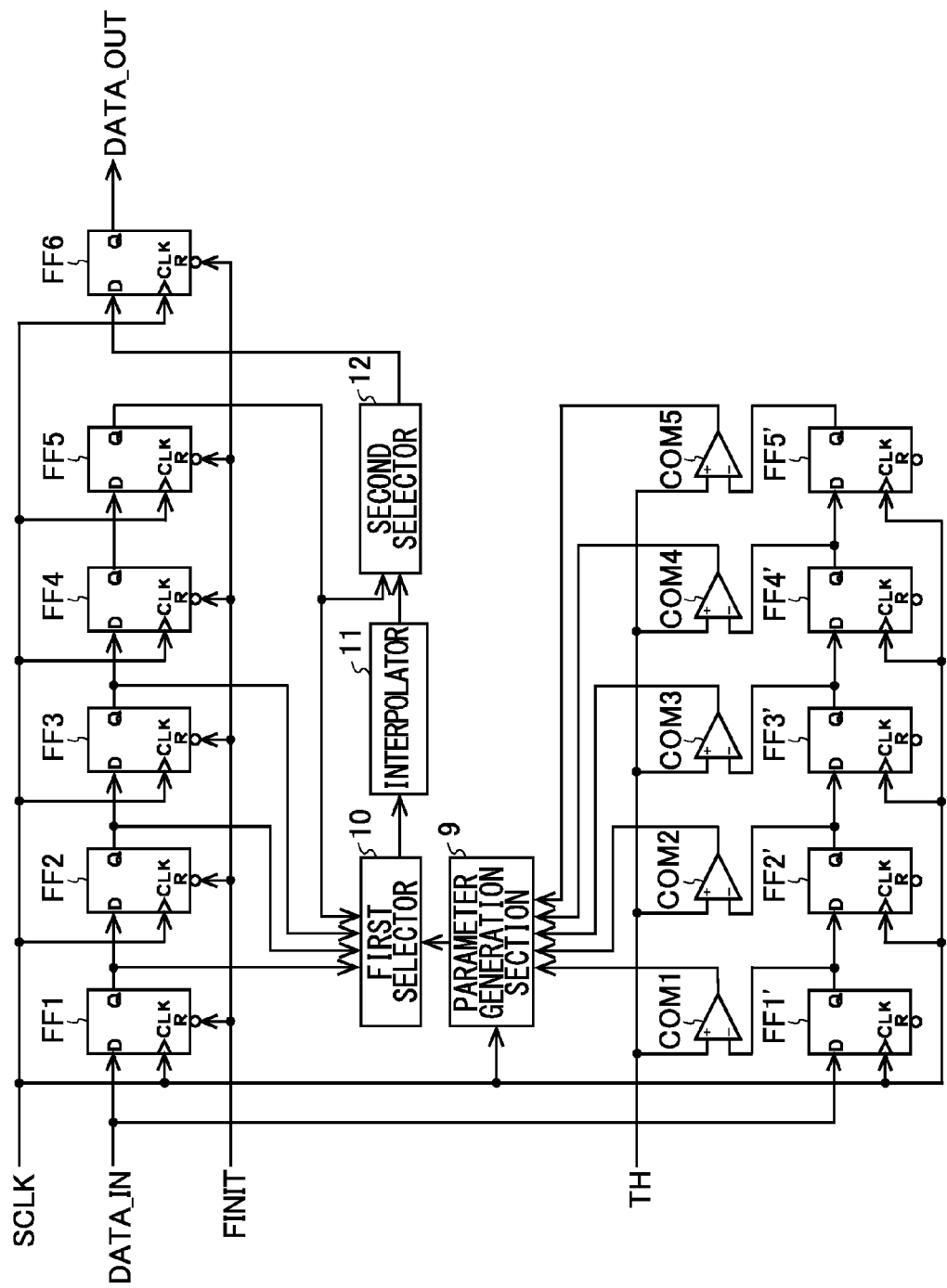
[FIG. 6] A diagram showing an example of a configuration of the data interpolation processing section shown in FIG. 4.

Next, an example of a configuration of the data interpolation processing section shown in FIG. 4 is shown in FIG. 6. Flip-flops FF1-FF5 correspond to the holding section 5. Comparators COM1-COM5 and flip-flops FF1'-FF5' correspond to the comparison section 6. The parameter generation section 9, a first selector 10, and an interpolator 11 correspond to the calculation section 7. A second selector 12 and a flip-flop FF6 correspond to the interpolation section 8. This configuration makes it possible to judge up to three optical sensors in series to be missing sensors.

A system clock signal SCLK, a reset signal FINIT, and a threshold value TH are supplied from a control section which controls the entire touch panel embodying the present invention. The threshold value TH is stored in a nonvolatile memory incorporated in the control section.

The flip-flops FF1-FF5 hold five data components of sequentially inputted input data DATA_IN. Likewise, the flip-flops FF1'-FF5' also hold the five data components of the sequentially inputted input data DATA_IN. A comparator COMk compares an output signal from an optical sensor 4 held by a corresponding flip-flop FFk' with the threshold value TH which is set in advance; if the output signal from the optical sensor 4 held by the flip-flop FFk' is not greater than the threshold value TH, the comparator COMk feeds the parameter generation section 9 with a comparison result signal (high level signal) indicating that the output signal from the specific optical sensor 4 is insufficient, in other words, that the specific optical sensor 4 is a missing sensor, and if the output signal from the optical sensor 4 held by the flip-flop FFk' is greater than the threshold value TH, the comparator COMk feeds the parameter generation section 9 with a comparison result signal (a low level signal) indicating that the output signal from the specific optical sensor 4 is sufficient, in other words, that the specific optical sensor 4 is not a missing sensor (here, "k" is a natural number that is 1 or larger and 5 or smaller).

The parameter generation section 9 generates parameters which are necessary for calculating the interpolation data based on output signals of the comparators COM1-COM5. There are a total of 32 ($=2^5$) combinations of output signals of comparators COM1-COM5. Also, as described above, with the configuration shown in FIG. 6, it is possible to judge up to three optical sensors in series to be a missing sensor. Here, the calculation section 7 would need to have a large circuit scale to perform interpolation processing with respect to all of the 32 combinations of comparison results, and thus, in the configuration shown in FIG. 6, the calculation section 7, by using the optical-sensor output signal held by the flip-flop FF5 as a reference signal, judges how many optical sensors following the optical sensor of the reference signal output insufficient output signals. Seven comparison results shown in FIG. 7 cover all the patterns possible in a case where interpolation is performed. Each of the comparison results shown in FIG. 7 indicates an output signal of the comparator COM5, an output signal of the comparator COM4, an output signal of the comparator COM3, an output signal of the comparator COM2, and an output signal of the comparator COM1, in this order from left to right.

Figures 7, 8:
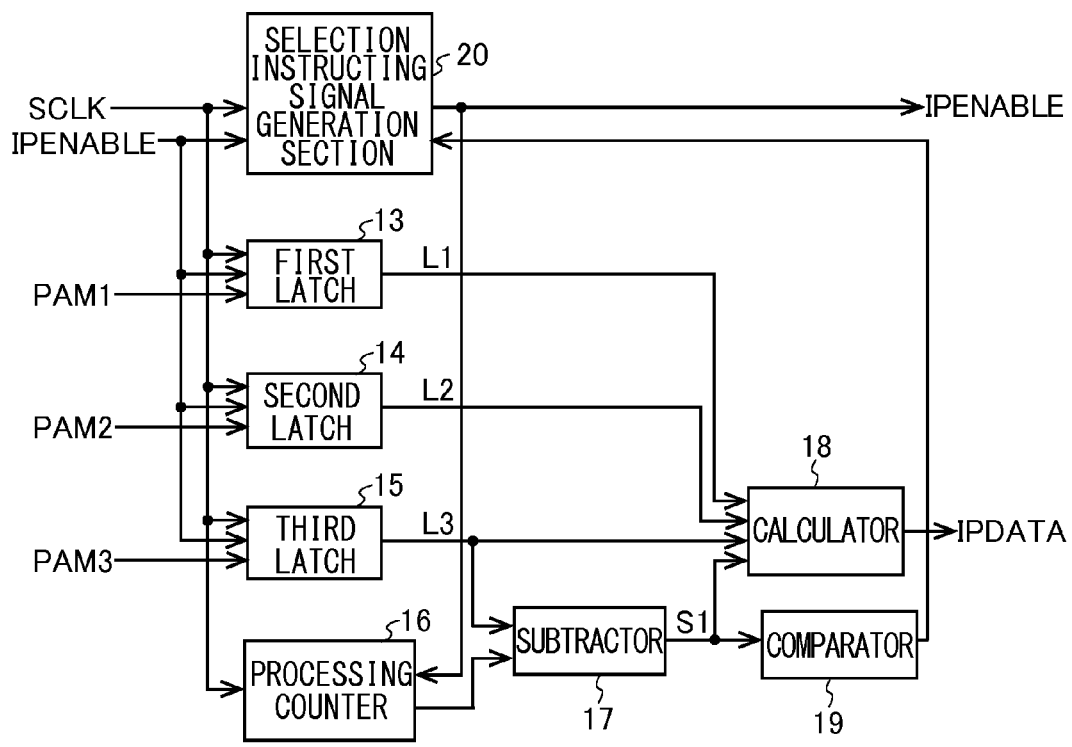
[FIG. 7] A diagram showing parameters generated by a parameter generation section provided in the data interpolation processing section shown in FIG. 4.
[FIG. 8] A diagram showing an example of a configuration of an interpolator provided in the data interpolation processing section.

In cases of comparison results of combinations other than the seven combinations of comparison results shown in FIG. 7, interpolation does not need to be performed, and thus, the parameter generation section 9 does not set first to third parameters.

In a case in which the comparison result is any one of LHLLL, LHLLH, LHLHL, and LHLHH, the parameter generation section 9 sets the first parameter to a value indicating the flip-flop FF5, sets the second parameter to a value indicating the flip-flop FF3, and sets the third parameter to an inclination factor "2" (see FIG. 7).

In a case in which the comparison result is either LHHLL or LHHLH, the parameter generation section 9 sets the first parameter to a value indicating the flip-flop FF5, sets the second parameter to a value indicating the flip-flop FF2, and sets the third parameter to an inclination factor "3" (see FIG. 7).

In a case in which the comparison result is LHHHL, the parameter generation section 9 sets the first parameter to a value indicating FF5, sets the second parameter to a value indicating the flip-flop FF1, and sets the third parameter to an inclination factor "4" (see FIG. 7).

The first selector 10 outputs an output value of the flip-flop that is set as the first parameter to the interpolator 11 as PAM1, outputs an output value of the flip-flop that is set as the second parameter to the interpolator 11 as PAM2, and outputs the inclination factor set as the third parameter to the interpolator 11 as PAM3.

Next, an example of a configuration of the interpolator 11 is shown in FIG. 8. In the configuration shown in FIG. 8, the interpolator 11 includes a first latch 13, a second latch 14, a third latch 15, a processing counter 16, a subtractor 17, a calculator 18, a comparator 19, and a selection instructing signal generation section 20.

While the number of pieces of data to be interpolated ("1" if the comparison result is LHLLL, LHLLH, LHLHL, or LHLHH; "2" if the comparison result is LHHLL or LHHLH; and "3" if the comparison result is LHHHL) is processed by the calculator 18, the first latch 13 holds the output value PAM1 of the flip-flop set as the first parameter, the second latch 14 holds the output value PAM2 of the flip-flop set as the second parameter, and the third latch 15 holds the inclination factor PAM3 set as the third parameter.

The processing counter 16 counts a clock number of a system clock SCLK. While a selection instructing signal IPENABLE from the selection instructing signal generation section 20 remains "L", a count value is held at "1", and at the same time that the selection instructing signal IPENABLE from the selection instructing signal generation section 20 is changed to "H", the processing counter 16 starts counting up from "1".

The subtractor 17 outputs a value S1, which is obtained by subtracting a count number of the processing counter 16 from an output L3 of the third latch 15, to the calculator 18 and the comparator 19.

The calculator 18 calculates an interpolation value IPDATA by a linear least-squares method, by using an output L1 of the first latch 13, an output L2 of the second latch 14, an output L3 of the third latch 15, and the output S1 of the subtractor 17. The formula used here is as follows:

$$IPDATA = S1 \times (L1 - L2)/L3 + L2$$

As shown in the formula, the calculator 18 performs division in the calculation, inviting a delay in the calculation processing. To cope with this, the selection instructing signal IPENABLE is inputted to the first latch 13, the second latch 14, the third latch, and the selection instructing signal generation section 20, such that the selection instructing signal IPENABLE is latched and the selection instructing signal IPENABLE is held during a data number delayed by the interpolation processing.

The comparator 19 compares the output S1 of the subtractor 17 with a comparison set value "1", to thereby judge whether or not the output S1 of the subtractor 17 is "1". In a case in which an output signal of the comparator 19 is a signal indicating that the output S1 of the subtractor 17 is "1", the selection instructing signal generation section 20 makes the selection instructing signal IPENABLE "L". In contrast, in a case in which an output signal of the comparator 19 is not a signal indicating that the output S1 of the subtractor 17 is "1", the selection instructing signal generation section 20 makes the selection instructing signal IPENABLE "H".

Here, with reference back to FIG. 6, a description will be given of the second selector 12 and the flip-flop FF6 which correspond to the interpolation section 8 in FIG. 4. The second selector 13 selects the interpolation value IPDATA outputted from the interpolator 11 and supplies it to the flip-flop FF6 only when the selection instructing signal IPENABLE from the interpolator 11 is "H", while, when the selection instructing signal IPENABLE from the interpolator 11 is "L", the second selector 13 selects the output of the flip-flop FF5 and supplies it to the flip-flop FF6. An output of the flip-flop FF6 is output data DATA_OUT of the data interpolation processing section.

With the above-configured touch panel embodying the present invention, which automatically detects an output signal of a missing sensor and interpolates the output signal of the missing sensor by using output signals of optical sensors around the missing sensor, it is possible to alleviate the problem of periodical occurrence of remarkable output reduction of an optical sensor caused by arranging a plurality of mirrors.

Furthermore, with the above-configured touch panel embodying the present invention, which automatically detects an output signal of a missing sensor, the data interpolation processing section does not need to acquire information of overlapping positions of the mirrors. Thus, the data interpolation processing section can be commonly used for cases of different mirror arrangements, and this makes the data interpolation processing section highly versatile.

It should be understood that the embodiments specifically described above are not meant to limit the present invention, and that many variations and modifications can be made within the spirit of the present invention.

INDUSTRIAL APPLICABILITY

The present invention is useful for optical-sensor touch panels which use optical sensors to detect positions on which input operations are performed by using a pen point, a fingertip, or the like.

LIST OF REFERENCE SYMBOLS 1 liquid crystal panel
2 mirror
3 LED
4 optical sensor
5 holding section
6 comparison section
7 calculation section
8 interpolation section
9 parameter generation section
10 first selector
11 interpolator
12 second selector
13 first latch
14 second latch
15 third latch
16 processing counter
17 subtractor
18 calculator
19 comparator
20 selection instructing signal generation section
FF1-FF6, FF1'-FF6' flip-flop
COM1-COM5 comparator

The invention claimed is:
1. A touch panel, comprising:
a display panel;
a plurality of mirrors arranged at an edge of a display surface of the display panel;
a light source;
a plurality of optical sensors which are embedded in the display panel to be positioned immediately under the mirrors such that light emitted from the light source is directed to the plurality of optical sensors by the mirrors; and
a data interpolation processing section which, in a case where an output signal from an optical sensor included in the plurality of optical sensors is not greater than a threshold value, calculates interpolation data by using output signals from optical sensors around the optical sensor which are greater than the threshold value; wherein
the data interpolation processing section comprises a holding section, a comparison section, a calculation section, and an interpolation section;
the holding section holds output signals from a predetermined number of optical sensors included in output signals from the plurality of optical sensors;
the comparison section compares each of the output signals from the predetermined number of optical sensors included in the output signals from the plurality of optical sensors with the threshold value such that, in a case where an output signal from an optical sensor is not greater than the threshold value, the comparison section notifies the calculation section that the output signal from the optical sensor is insufficient, and, in a case where an output signal from an optical sensor is greater than the threshold value, the comparison section notifies the interpolation section that the output signal from the optical sensor is sufficient;
the calculation section calculates interpolation data for an output signal from an optical sensor which is notified to the calculation section by the comparison section as outputting insufficient output signal; and
the interpolation section outputs an output from the holding section as output data with respect to an output signal from an optical sensor which is notified to the interpolation section by the comparison section as outputting an insufficient output signal, and the interpolation section outputs an output from the calculation section as output data with respect to an output signal from an optical sensor which is not notified to the interpolation section by the comparison section as outputting a sufficient output signal.
2. The touch panel of claim 1, wherein the calculation section calculates the interpolation data by using a linear least-squares method.

* * * * *